(12) United States Patent
Clément et al.

(10) Patent No.: US 11,537,124 B2
(45) Date of Patent: Dec. 27, 2022

(54) BUILT-IN SAFETY OF CONTROL STATION AND USER INTERFACE FOR TELEOPERATION

(71) Applicant: Teleo, Inc., Mountain View, CA (US)

(72) Inventors: Romain Clément, Mountain View, CA (US); Vinay Shet, Fremont, CA (US)

(73) Assignee: Teleo, Inc., Mountain View, CA (US)

( * ) Notice: Subject to any disclaimer, the term of this patent is extended or adjusted under 35 U.S.C. 154(b) by 0 days.

(21) Appl. No.: 17/243,550

(22) Filed: Apr. 28, 2021

(65) Prior Publication Data

US 2021/0344876 A1  Nov. 4, 2021

Related U.S. Application Data

(60) Provisional application No. 63/017,605, filed on Apr. 29, 2020.

(51) Int. Cl.
| | |
|---|---|
| H04N 7/18 | (2006.01) |
| G05D 1/00 | (2006.01) |
| H04N 5/262 | (2006.01) |
| H04N 5/247 | (2006.01) |
| G06F 21/32 | (2013.01) |
| H04N 5/268 | (2006.01) |
| H04N 7/01 | (2006.01) |
| H04N 5/272 | (2006.01) |
| G06F 3/0484 | (2022.01) |

(52) U.S. Cl.
CPC ......... *G05D 1/0038* (2013.01); *G06F 3/0484* (2013.01); *G06F 21/32* (2013.01); *H04N 5/247* (2013.01); *H04N 5/268* (2013.01); *H04N 5/2624* (2013.01); *H04N 5/272* (2013.01); *H04N 7/0117* (2013.01); *H04N 7/181* (2013.01)

(58) Field of Classification Search
CPC ..... G05D 1/0038; G06F 3/0484; G06F 21/32; H04N 5/247; H04N 5/2624; H04N 5/268; H04N 5/272; H04N 7/0117; H04N 7/181
See application file for complete search history.

(56) References Cited

U.S. PATENT DOCUMENTS

| | | | | |
|---|---|---|---|---|
| 10,614,617 | B2* | 4/2020 | Fortmann | G05D 1/0094 |
| 11,048,105 | B1* | 6/2021 | Roy | G06F 3/013 |
| 11,079,753 | B1* | 8/2021 | Roy | G05D 1/0278 |
| 2015/0015479 | A1* | 1/2015 | Cho | G06F 3/1423 |
| | | | | 345/156 |
| 2019/0196464 | A1* | 6/2019 | Lockwood | G05D 1/0038 |
| 2019/0302761 | A1* | 10/2019 | Huang | G05D 1/0221 |
| 2020/0007844 | A1* | 1/2020 | Seo | B60R 1/00 |
| 2020/0378782 | A1* | 12/2020 | Gonzalez | A01D 90/08 |
| 2022/0113737 | A1* | 4/2022 | Kobayashi | B60W 60/001 |

\* cited by examiner

*Primary Examiner* — Michael Lee
(74) *Attorney, Agent, or Firm* — Cognition IP, P.C.; Edward Steakley; Rajesh Fotedar

(57) ABSTRACT

A method and system may receive tiled video feed data sourced from one or more remotely situated vehicles. A teleoperator user interface is generated to include a concurrent display of a plurality of distinct video tiles from the tiled video feed data. A respective video tile displayed in the teleoperator user interface may include visual safety cues. A user interface segment that is displaying a respective video tile may be modified in response to teleoperator input.

19 Claims, 17 Drawing Sheets

(DEFAULT USER INTERFACE W/ VIDEO TILES
HAVING GRAPHICAL INDICIUM)

(INTERFACE SEGMENT W/ VIDEO TILE HAVING HEIGHT CLEARANCE GRAPHICAL INDICIUM)

BUILT-IN SAFETY OF CONTROL STATION AND USER INTERFACE FOR TELEOPERATION

CROSS-REFERENCE TO RELATED APPLICATIONS

This application claims the benefit of U.S. Provisional Application No. 63/017,605, filed Apr. 29, 2020, which is hereby incorporated by reference in its entirety.

BACKGROUND

The field of teleoperation has recently experienced a tremendous amount of innovation, as well as popular interest. Teleoperation generally refers to the control of a system by a human operator that is remotely located a distance away from the system. The system may perform various actions according to underlying software that determines which actions are to be performed by the system. In many cases, such tasks are predetermined tasks or repetitive tasks. The human operator may be provided with telepresence such that the human operator is provided visual and audio information that would be physically available to him as if he were directly operating the system at the current location of the system. Based on the visual and audio information, the human operator may direct or augment the actions performed by the system.

SUMMARY

Various embodiments relate to a control station at a control center receiving tiled video feed data sourced from one or more remotely situated vehicles. The control station generates a teleoperator user interface with a plurality of user interface segments for concurrent display of a plurality of distinct video tiles from the tiled video feed data. In response to teleoperator input, the control station modifies one or more user interface segments displaying a respective video tile while the teleoperator user interface is displayed. Such modification may be a modification to the size and/or display resolution of the user interface segment. In other embodiments, such modification may be switching between display of different video tiles in the user interface segment.

Other embodiments relate to toggling between different camera views within user interface segments. For example, the toggling may be between the display of video tiles portraying fields of vision from different cameras mounted on a vehicle. In various embodiments, a first user interface segment for front facing camera views may display a default view of a video tile sourced from a first front-facing camera, such as a front-facing camera mounted on the windshield to provide what would be a driver's field of vision. A human teleoperator may manipulate a peripheral device of the control station to generate input requesting to modify the video tile displayed in the first user interface segment. Based on the input, the first user interface segment for front facing camera views may display a different video tile sourced from a second front-facing camera, such as a front-facing camera mounted on top of the vehicle's main cabin to provide an upper field of vision.

Other embodiments relate to each of the video tiles in the tiled video feed data including a graphical indicium overlay that is pre-assigned to each camera. Each graphical indicium overlay acts as a visual cue with respect to a safety distance to be maintained by the vehicle.

Other embodiments relate to control station security for validating the presence of an authorized human teleoperator and locking/unlocking control station functionalities and peripheral devices based on detecting an extent of the authorized human teleoperator's attention. For example, the control station identifies an authorized human teleoperator of the control station based on validating a visual image(s) of the human teleoperator. The control station may also determine whether to lock/unlock one or more control station functionalities selectable by the authorized human teleoperator based on validating the authorized human teleoperator's degree of attentiveness.

Embodiments may relate to one or more vehicles operating within a pre-defined geographical area, such as a construction site. The vehicles may be construction site vehicles.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
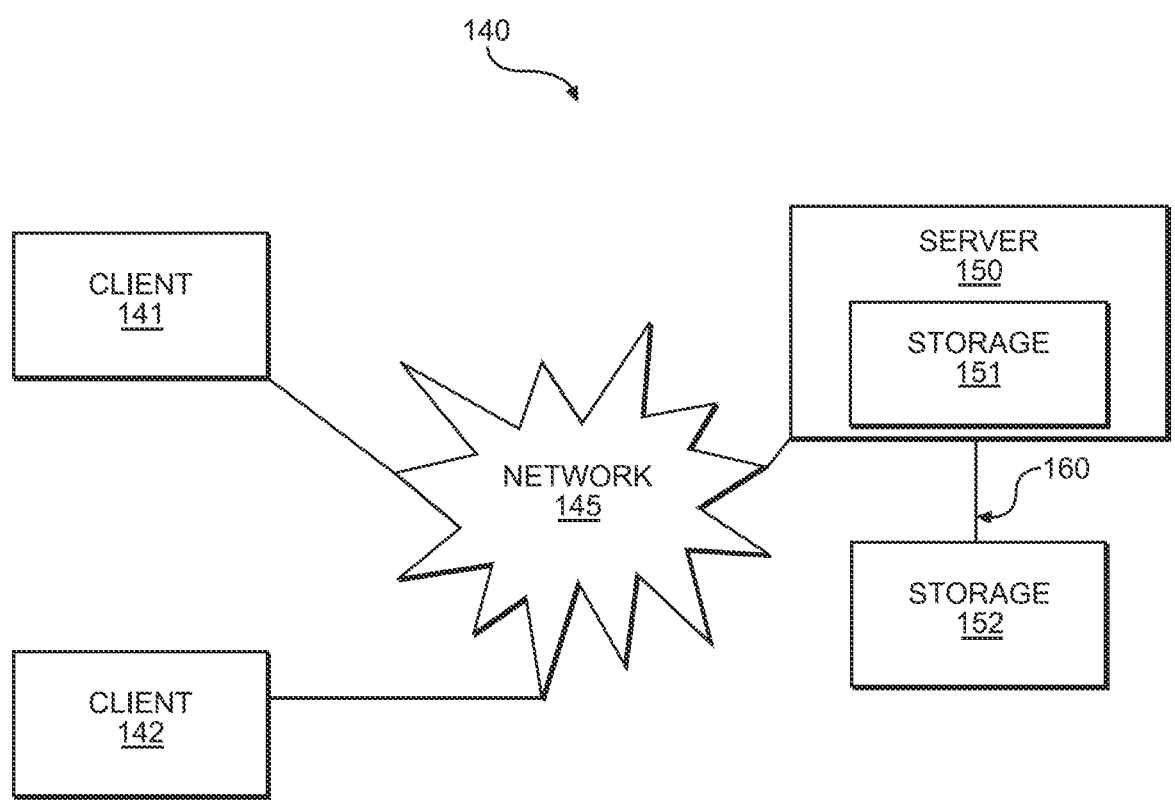
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

It is understood that the terms "vehicles" or "robot" may mean any platform which could be operated over teleoperation. According to various embodiments, a vehicle may be, but is not limited to, a skid steer, a compact track loader, a wheeled loader, a backhoe, an excavator, a loading trick, a bulldozer and a compactor.

FIG. 1A illustrates an exemplary network environment in which embodiments may operate. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
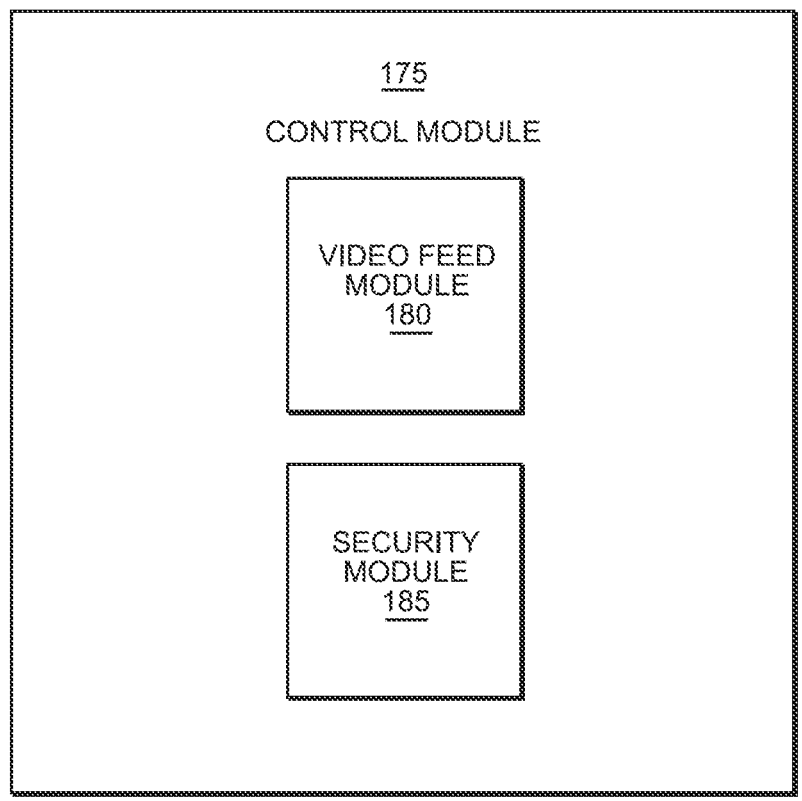
FIG. 1B is a diagram illustrating an exemplary environment in which some embodiments may operate.

FIG. 1B illustrates exemplary software modules that may execute some of the functionality described herein by FIGS. 2A-C, FIGS. 3A-B, FIG. 4, FIGS. 5A-5B, FIGS. 6A-6C, FIGS. 7A-7B and FIG. 8. For example, a control module 175 may be part of a control center and/or part of a control station operated by a human teleoperator present at the site of the control center. The control module 175 includes a video feed module 180 and a security module 185. In some embodiments, the video feed module 180 may execute some of the functionality described herein by FIGS. 2A-B, FIGS. 3A-B, FIG. 4, FIGS. 5A-5B, FIGS. 6A-6C, FIGS. 7A-7B and FIG. 8. In some embodiments, security module 185 may execute some of the functionality described herein by FIG. 2C. It is understood that, in various embodiments, both the video feed module 180 and the security module 185 may be involved in executing various parts of the functionality described herein by FIGS. 2A-C, FIGS. 3A-B, FIG. 4, FIGS. 5A-5B, FIGS. 6A-6C, FIGS. 7A-7B and FIG. 8. In various embodiments, both the video feed module 180 and the security module 185 may execute respective functionalities described herein on data generated by functionality described by FIG. 3A and FIG. 4.

Figure 2A:
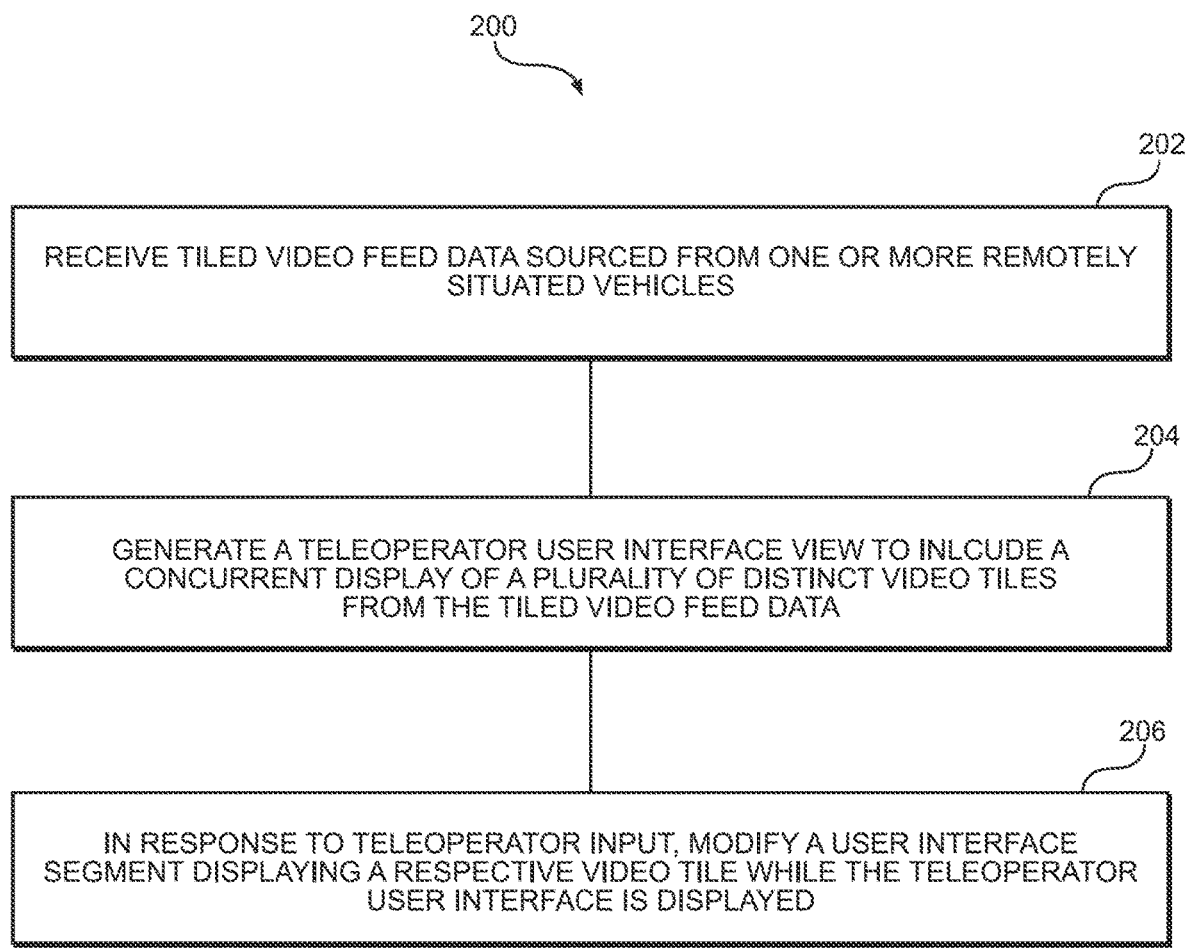
FIGS. 2A, 2B, 2C are flowcharts illustrating an exemplary methods that may be performed in some embodiments.

As shown in flowchart 200 of FIG. 2A, the control module 175 (and/or the video feed module 180) receives tiled video feed data sourced from one or more remotely situated vehicles (Act 202). For example, a plurality of cameras may be mounted on a vehicle remotely situated from the control module 175. Each camera generates real-time video data portraying its field of vision. The video data from each camera is defined and formatted as a video tile and one or more video tiles from the cameras on the same vehicle are included the in tiled video feed data at the vehicle and transmitted from the vehicle.

The control module 175 generates a teleoperator user interface to include a concurrent display of a plurality of distinct video tiles from the tiled video feed data (Act 204). The control module 175 generates a teleoperator user interface that has one or more user interface segments in which respective video tiles can be displayed. In response to teleoperator input, the control module 175 modifies a user interface segment that is displaying a respective video tile (Act 206). The modification of the user interface segment occurs while the teleoperator user interface is displayed. For example, a human teleoperator may provide input to toggle between different video tiles sourced from different cameras mounted on the same vehicle. Such toggling may occur within a same specific user interface segment, such as a front-facing camera user interface segment in which the human teleoperator can toggle between different video tiles sourced from a plurality of front-facing cameras mounted on the same vehicle.

Figure 2B:
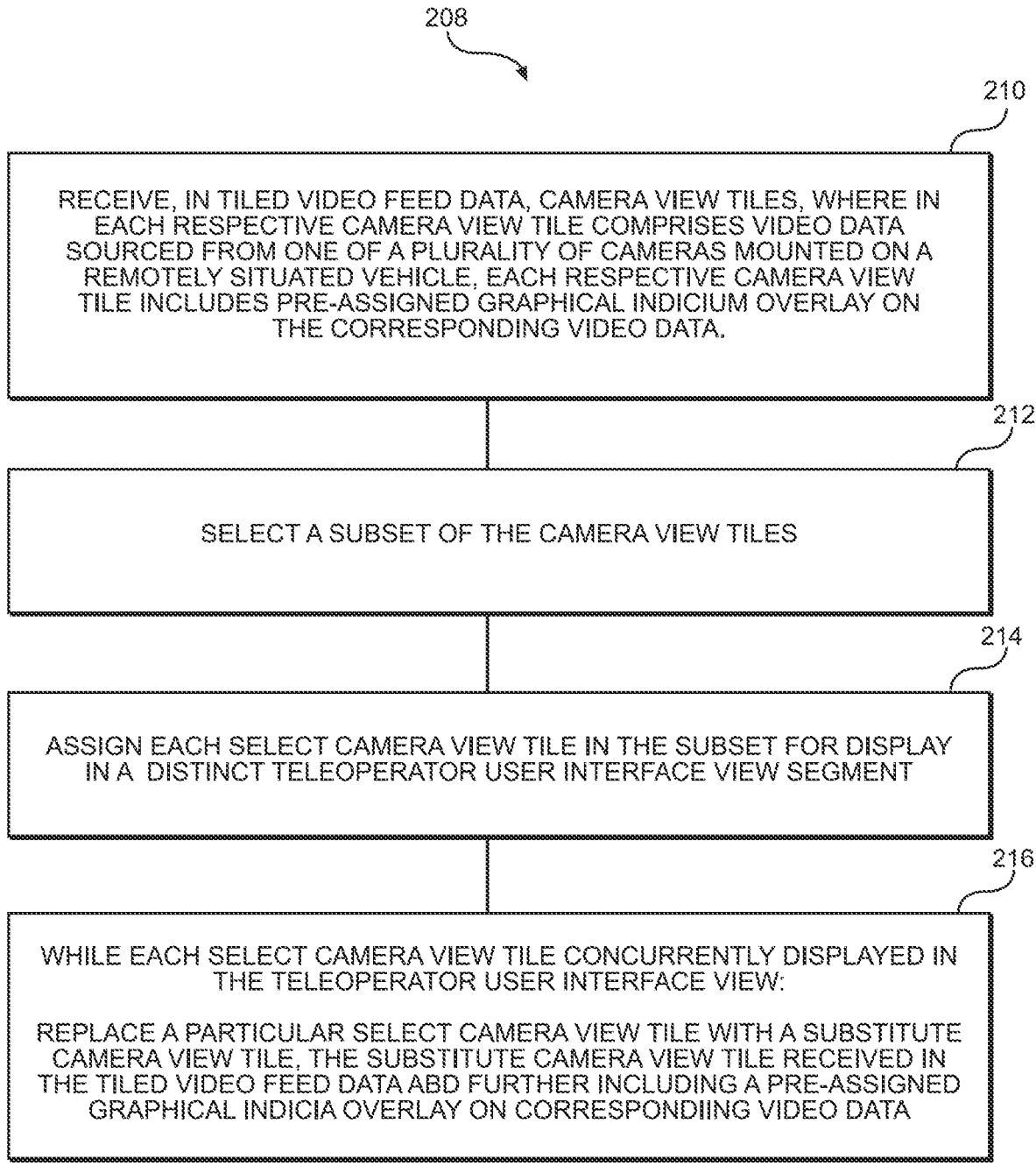

As shown in flowchart 208 of FIG. 2B, the control module 175 (and/or the video feed module 180) receives, in the tiled video feed data, camera view tiles (Act 210). Each respective camera view tile comprises video data sourced from one of a plurality of cameras mounted on a particular remotely situated vehicle, such as a construction vehicle located at a construction site. Each respective camera view tile includes a pre-assigned graphical indicium overlay on the corresponding video data. The pre-assigned graphical indicium overlay may represent safety distances to be observed by the vehicle. In some embodiments, the graphical indicium overlay is incorporated into the video data of each corresponding camera view tile by one or more computer systems of the vehicle.

Upon receipt of the tiled video feed data, the control module 175 selects a subset of the camera view tiles from the plurality of cameras mounted on the particular remotely situated vehicle (Act 212). For example, a user interface segment may be dedicated for display of real time video of a rear-facing camera. The tiled video feed data may include multiple camera view tiles, each from different rear-facing cameras mounted in the vehicle. The control module 175 may select one of the rear-facing camera video tiles to be displayed and may flag the remaining unselected rear-facing camera video tiles as being available for selection by the human teleoperator.

The control module 175 assigns each select camera view tile in the subset for display in a distinct teleoperator user interface segment (Act 214). For example, the control module 175 assigns the selected rear-facing camera video tile to the user interface segment dedicated for rear-facing cameras. While each select camera view tile is concurrently displayed in the teleoperator user interface, the control module 175 replaces a particular select camera view tile with a substitute camera view tile. It is understood that the substitute camera view tile may have been received in the tiled video feed data and also includes a pre-assigned graphical indicium overlay on its corresponding video data (Act 216). The human teleoperator may manipulate a peripheral input device of the control station, such as a joystick, to trigger substitution of the particular select camera view tile with the substitute camera view tile. In various embodiments, it is understood that the human teleoperator may select which camera view tiles are to be displayed (as in Act 212) and also assign the various user interface segments for the selected camera view tiles.

Figure 2C:
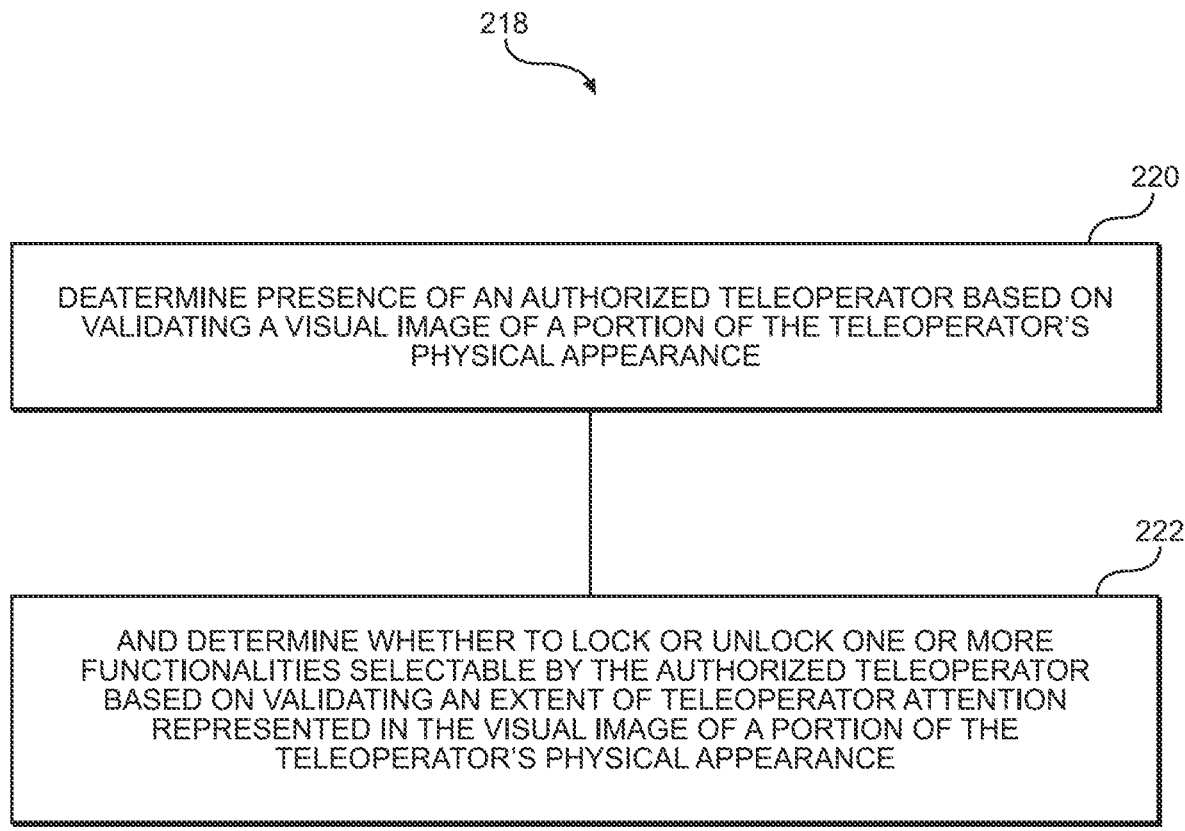

As shown in flowchart 218 of FIG. 2C, the security module 185 determines presence of an authorized teleoperator based on validating a visual image of a portion of the operator's physical appearance (Act 220). For example, the security module 185 may perform face recognition analysis upon detecting presence of a potential human teleoperator. The face recognition analysis is performed by the security module 185 on a captured image of the potential human teleoperator and compared to data representing facial features of an authorized human teleoperator. Upon determining a threshold match between characteristics of the captured image and the data representing the facial features, the security module 185 switches to an unlocked mode and allows access to one or more control station functionalities. Upon determining absence of the threshold match, the security module 185 switches to a locked mode and allows access to one or more control station functionalities only based on receipt of supplementary security input, such as a security code and/or password.

The security module 185 determines whether to lock or unlock one or more control station functionalities selectable by an authorized teleoperator based on validating an extent of teleoperator attention represented in the visual image of a portion of the operator's physical appearance (Act 222). In some embodiments, the security module 185 may include a camera that tracks movements and behaviors of an authorized teleoperator. For example, such tracking may include recording changes of facial movements and eye movements to determine if such movements result in a threshold match to data representing the movements of an alert and attentive authorized operator. Upon determining absence of a threshold match of such movements, the security module 185 may initiate a series of visual and/or audio alerts and/or initiate a pause mode on the functionalities of the control station or switch to the locked mode. While in the pause mode or locked mode, security module 185 may require a series of verification inputs or peripheral device actions (such as predetermined movements of joysticks, pedals, steering wheels, keyboard buttons and/or mouse) to determine whether the current teleoperator has acquired the attentiveness necessary to continue operation of the control station. In various embodiments, the locked mode and the unlocked mode may be initiated based on a result of a drug detection device, such as a breathalyzer, connected to the control station.

Some of the acts of the exemplary flowcharts 200, 208, 218 may be performed in different orders or in parallel. Also, one or more of the acts in the exemplary flowcharts 200, 208, 218 may occur in two or more computers, for example if the method is performed in a networked environment. Various acts may be optional. Some acts may occur on local computer with other acts occur on a remote computer. It is understood that exemplary flowcharts 200, 208 may be performed in whole, or in part, by the video feed module 180.

Figure 3A:
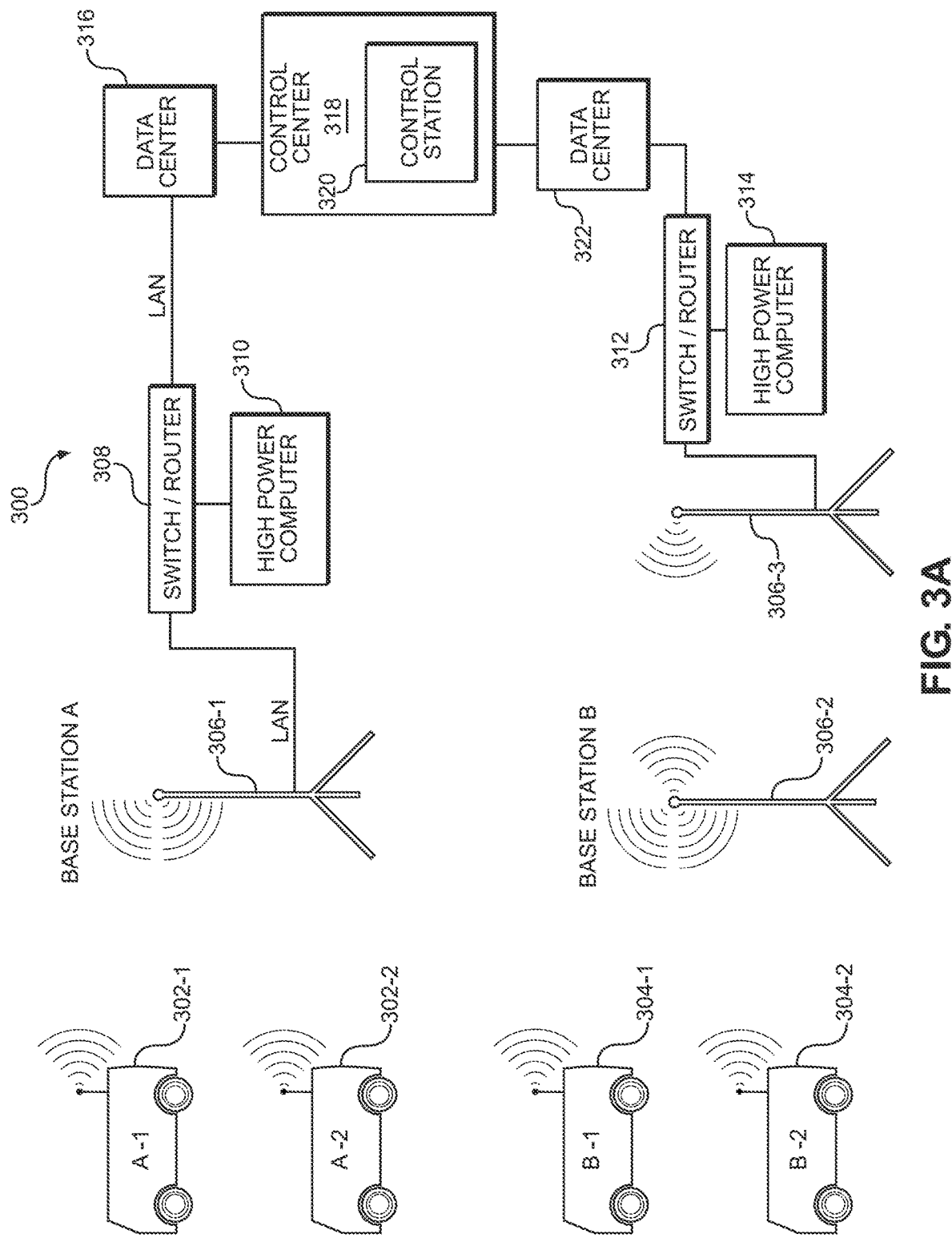
FIGS. 3A-3B are diagrams illustrating exemplary environments in which some embodiments may operate.

As shown in FIG. 3A, one or more vehicles 302-1, 302-2, 304-1, 304-2 communicate with a plurality of base stations 306-1, 306-2 at a pre-defined geographical area. Each base station 306-1, 306-2 may be connected to various routers 308, 312 in order to access deported compute modules 310, 314 to provide the vehicles 302-1, 302-2, 304-1, 304-2 access to optimized high-powered computing resources. One or more base stations 306-1, 306-2 may receive vehicle video feed data from the vehicles 302-1, 302-2, 304-1, 304-2 and the base stations 306-1, 306-2 may relay the vehicle video feed data via the routers 308, 312 to a remotely situated control center 318 that has one or more control stations 320 (i.e. control consoles). Each of the control stations 320 may have one or more authorized human teleoperators that have access to the functionalities, peripheral controls/devices, displays and systems of the respective control stations 320. The control center 318 and the base stations 306-1, 306-2 may also have access to various data centers 316, 322. In another embodiment, the multiple 302-1, 302-2, 304-1, 304-2 may communicate with one or more base stations (i.e. site-mesh systems, site-mesh nodes) 306-1, 306-2 located at a construction site.

Figure 3B:
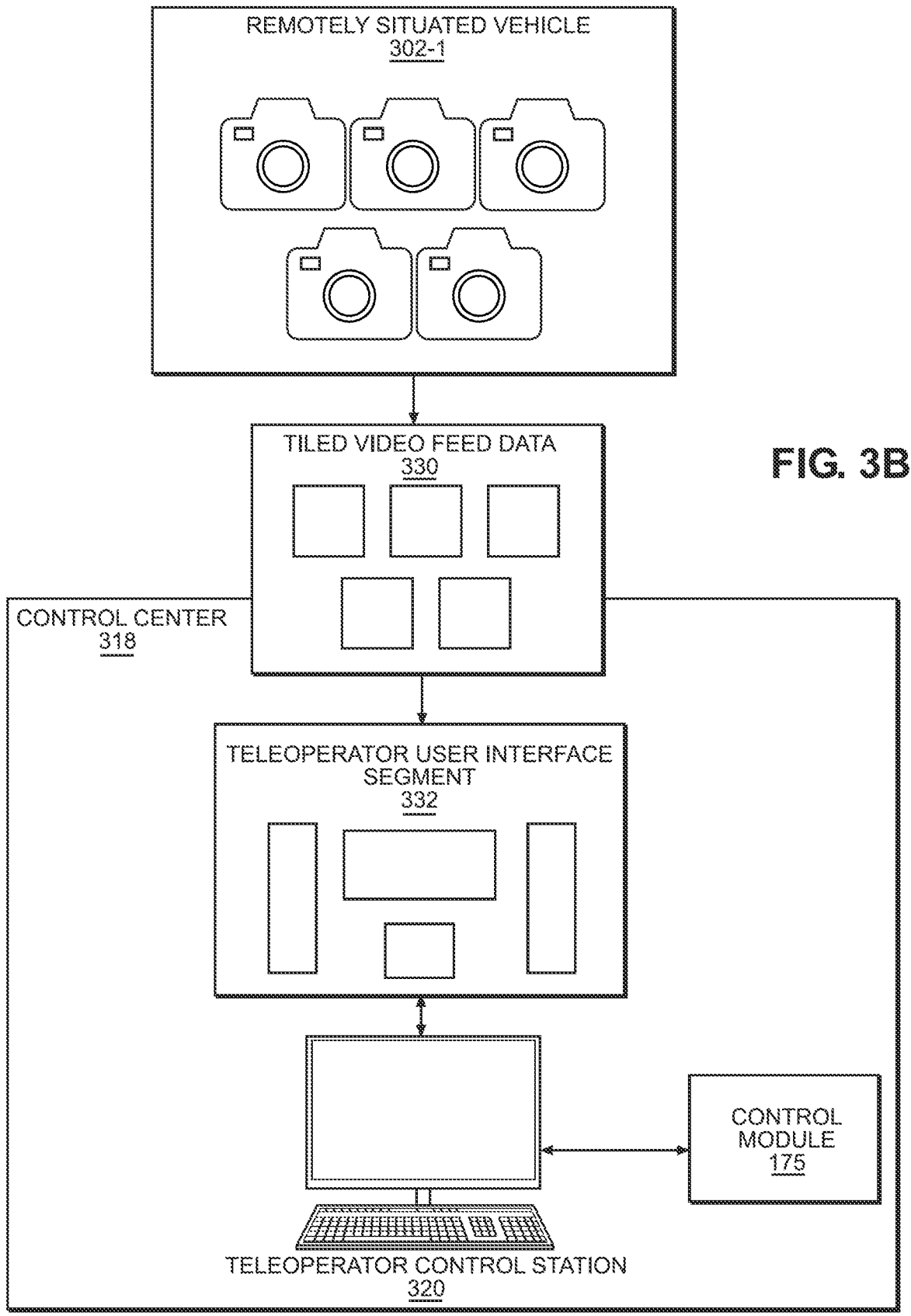

As shown in FIG. 3B, a remotely situated vehicle 302-1 may be a construction vehicle operating within a pre-defined geographical area, such as a construction site. A plurality of cameras may be mounted on the vehicle 302-1. The vehicle 302-1 may have various computer systems that compress video data from each of the cameras to created tiled video feed data 330. The tiled video feed data 330 may include real time video data sourced from all camera views from each camera mounted on the vehicle 302-1, where the video data from each camera view is formatted and transmitted as a distinct video tile in the tiled video feed data 330. The tiled video feed data 330 may be sent to one or more base stations 306-1, 306-2, which may additionally process the tiled video feed data 330 and relay processed tiled video feed data 330. In some embodiments, the base stations 306-1, 306-2 may relay the tiled video feed data 330 to the control center 318 without processing the tiled video feed data 330. In some embodiments, the vehicle 302-1 may send the tiled video feed data 330 directly to the control center 318. In various embodiments, the vehicle may format the camera views in the tiled video feed data 330 according to the size and placement of user interface segments 332.

The control center 318 receives the tiled video feed data 330 and provides the teleoperator control station 320 access to the received tiled video feed data 330. The control module 175 may be part of the control center 318. In other embodiments, the control module 175 may be part of the teleoperator control station 320. In some embodiments, the teleoperator control station 318 receives the tiled video feed data 330 directly from the vehicle 302-1. Various video tiles in the received tiled video feed data 330 may be selected by the control center 318, the control station 320 and/or the human teleoperator and assigned to respective distinct teleoperator user interface segments 332. The selected video tiles may be concurrently displayed in their assigned teleoperator user interface segments 332. Display of the video tiles and the teleoperator user interface segments 332 may be modified in response to input from an authorized human teleoperator.

Figure 4:
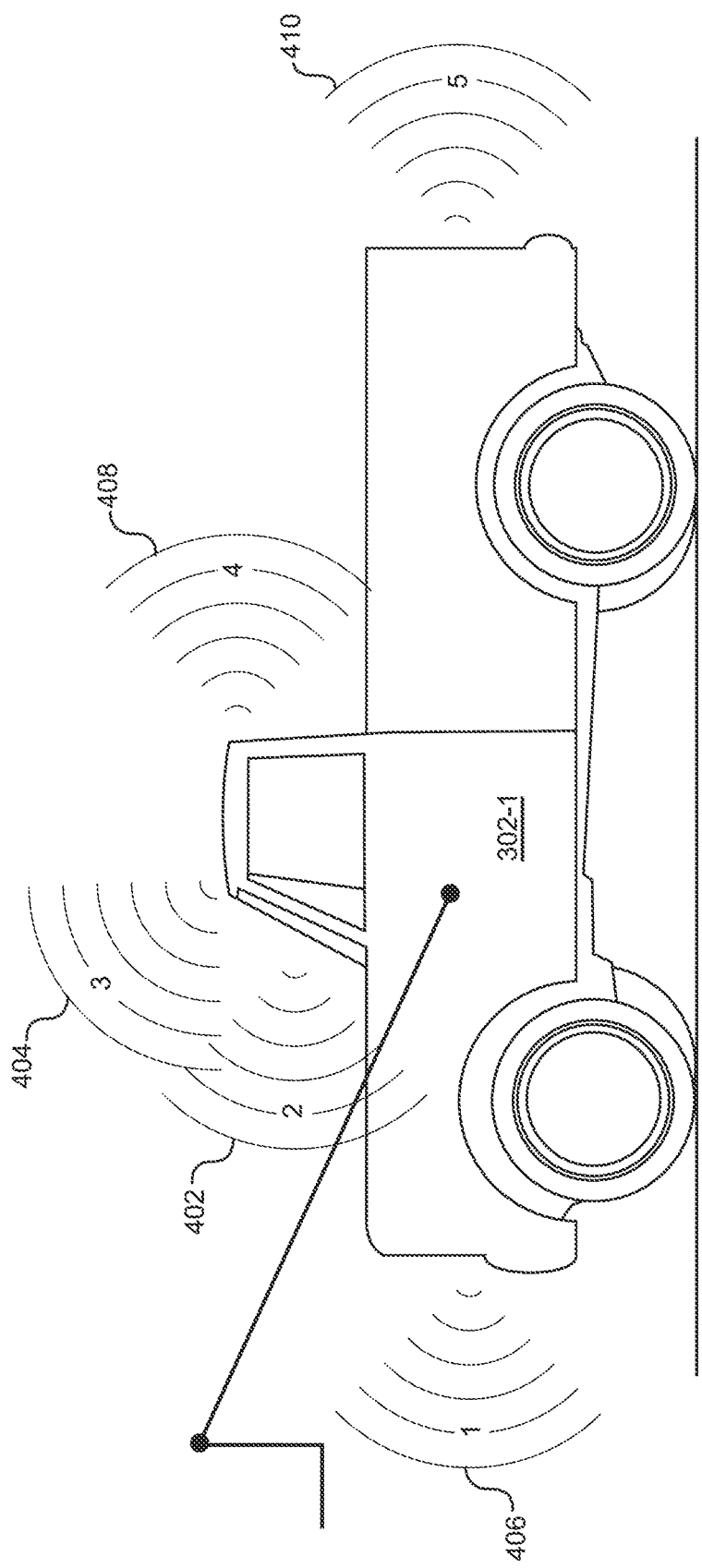
FIG. 4 is a diagram illustrating an exemplary environment in which some embodiments may operate.

As shown in FIG. 4, a plurality of fields of vision (or camera perspectives) 402, 404, 406, 408, 410 may be visible according to video data generated by respective cameras mounted on a vehicle 302-1. Various fields of vision 402, 404, 406 may be from cameras mounted on the front of the vehicle 302-1, such that each camera as the same front facing directional field of vision. Other fields of vision 408, 410 may be from cameras mounted at the rear of the vehicle 302-1, such that each camera as the same rear facing directional field of vision.

Figure 5A:
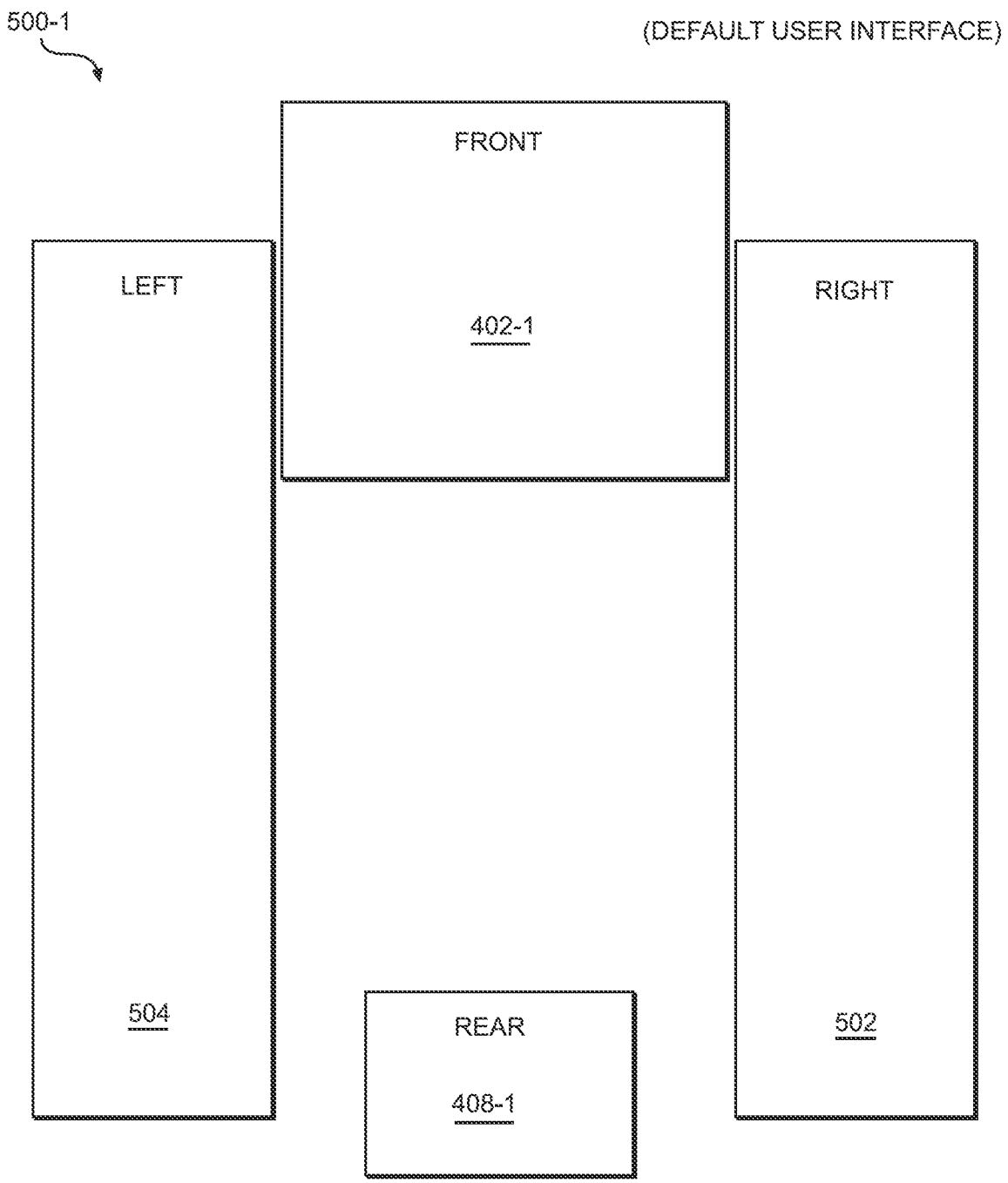
FIGS. 5A-5B are diagrams illustrating exemplary environments in which some embodiments may operate.

As shown in FIG. 5A, a default user interface view 500-1 for a user interface displayed at the teleoperator control station 320 includes various user interface segments for a front-facing camera view, a rear-facing camera view, a left-side camera view and a right-side camera view. A camera view tile 402-1 for a mid-field of vision 402 from a front-facing camera may be displayed in a user interface segment for front-facing cameras. A camera view tile 408-1 for an upper-field of vision 408 from a rear-facing camera may be displayed in a user interface segment for rear-facing cameras. User interface segments for right-side and left-side camera views may be populated with camera view tiles 502, 504 depicting fields of vision from a right-side mounted camera and a left-side mounted camera, respectively. According to the default user interface view 500-1, the user interface segment for the front-facing camera view displays the assigned camera view tile 402-1 at a larger size and/or higher display resolution than the size and/or display resolution of the camera view tile 408-1 assigned to the user interface segment for the rear-facing camera view. However, it is understood that the received tiled video feed data 330 includes respective camera view tiles from other front-facing and rear-facing cameras that have not been selected for display in the default user interface view 500-1.

Figure 5B:
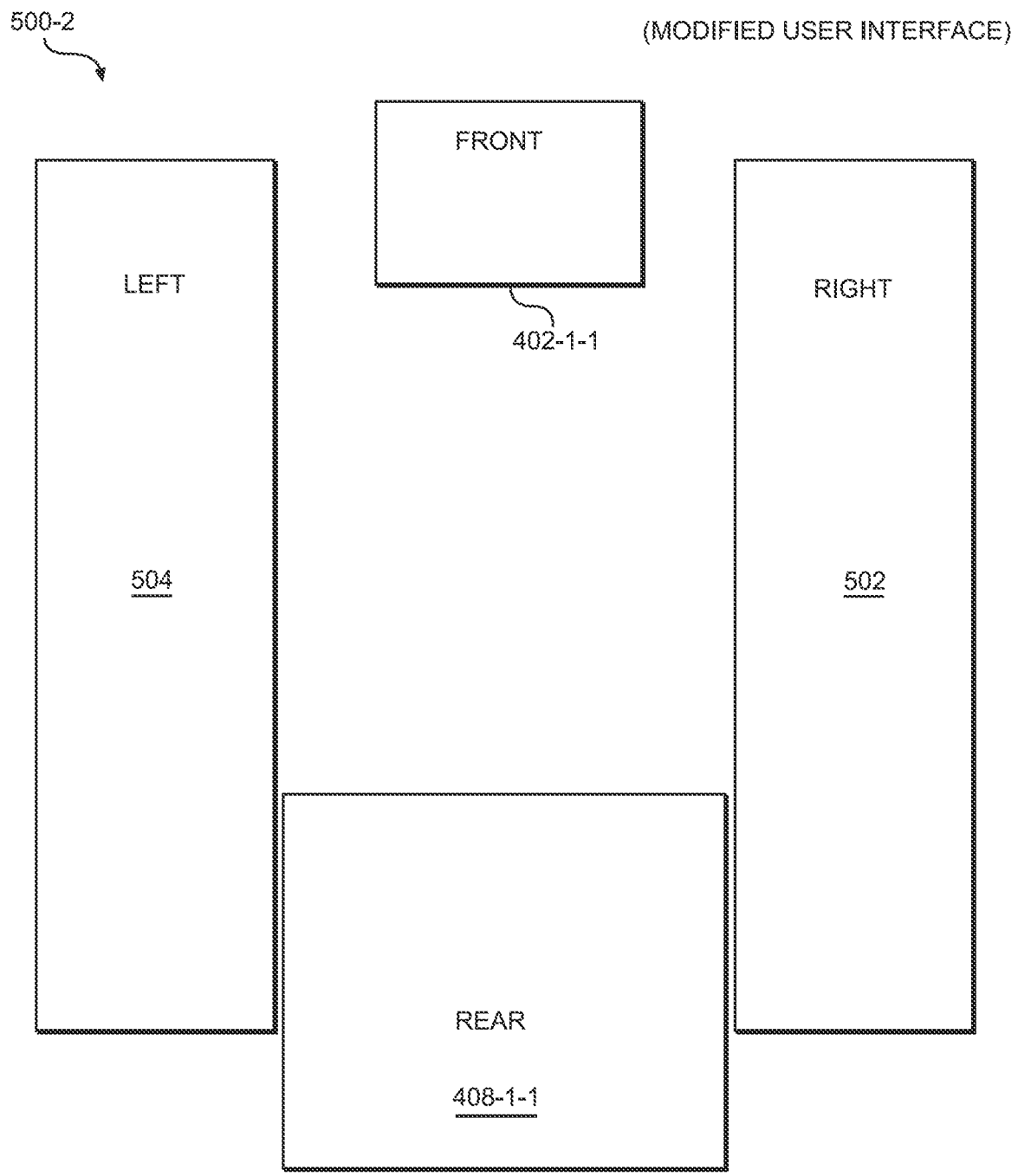

In various embodiments, teleoperator input may trigger modification of the size and/or resolution of one or more user interface segments. For example, the teleoperator may move a joystick according to a predetermined joystick gesture to trigger modification. As shown in FIG. 5B, based on the received teleoperator modification input, the control module 175 may modify the default user interface 500-1. The modified user interface 500-2 displays the assigned camera view tile 402-1, at a smaller size and/or lower display resolution 402-1-1 than the size and/or display resolution 408-1-1- of the camera view tile 408-1. According to various embodiments, display of the default user interface 500-1 transitions to display of the modified camera view 500-2 while all the user interface segments are concurrently displaying respective camera view tiles.

Figure 6A:
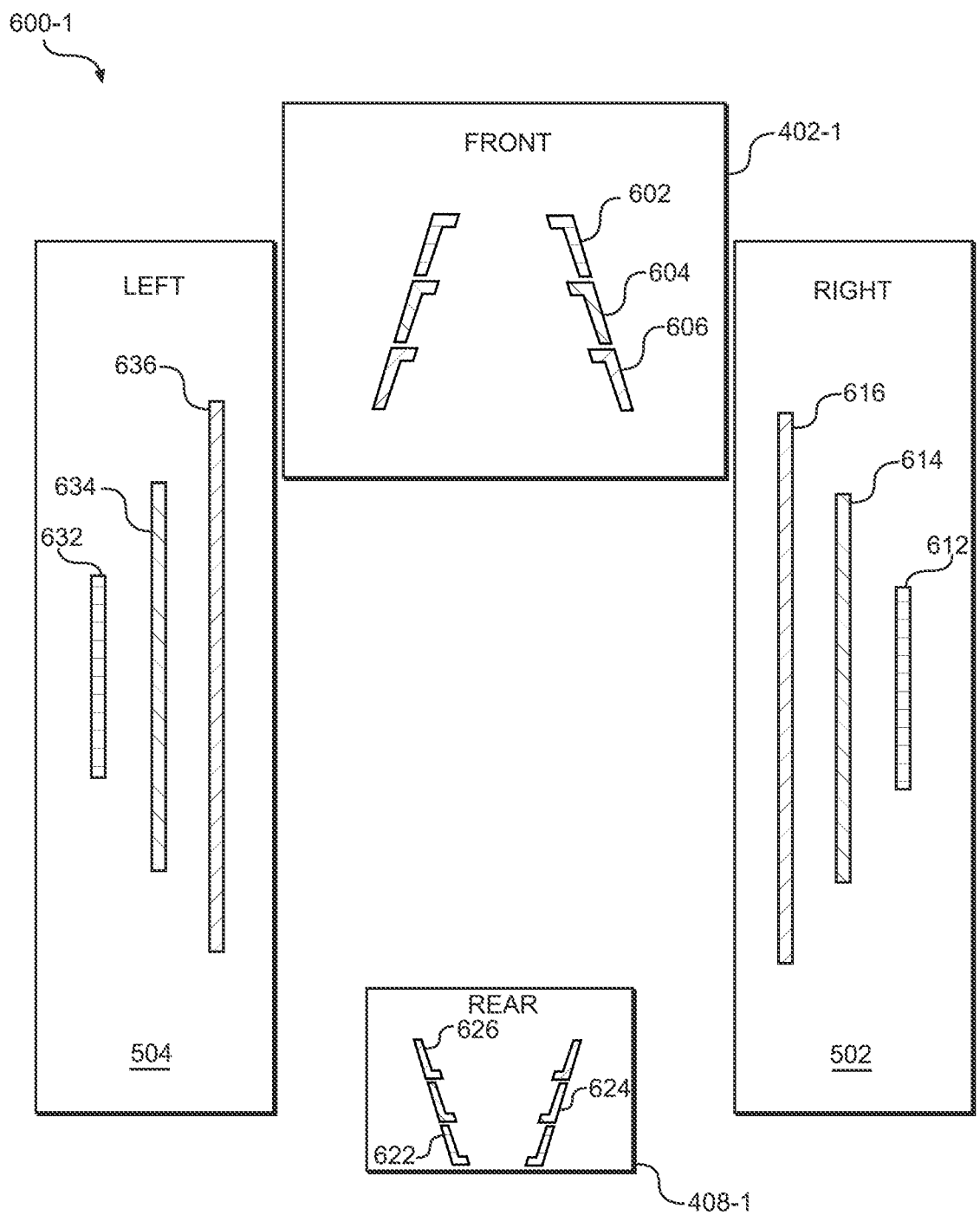
FIGS. 6A, 6B, 6C are diagrams illustrating exemplary environments in which some embodiments may operate.

As shown in FIG. 6A, a default user interface with graphical indicium overlays 600-1 includes various user interface segments (front-facing, rear-facing, right-side, left-side) for displaying camera view tiles that each include a pre-assigned graphical indicium overlay. Each graphical indicia may be previously calibrated (i.e. predetermined) to represent a measure of a safety distance to be represented in a specific camera view tile in accordance with an angle and placement of its source camera and one or more dimensions of various portions of the vehicle that are proximate to the mounted position of the source camera. For example, a group of graphical indicia may be arranged according to a chevron design that defines a minimum distance(s) a type of construction vehicle must respect when approaching a trench at a construction site. For example, a graphical indicium overlay may act as a visual cue of a height clearance for a type of construction vehicle that would enable an authorized teleoperator at the control station 320 to decide whether to send an approval for the construction vehicle to execute a safe vehicle turn (i.e. right turn, left turn) operation. According to another embodiment, a graphical indicium overlay may act as a visual indication of a minimum safety distance from other vehicles that should be visible in a display of a camera view tile. According to another embodiment, a graphical indicium overlay may indicate a clearance required for different operating events of the vehicle. For example, if the vehicle is a compact tracker loader, a first portion of the graphical indicium overlay may indicate a first clearance that allows the compact tracker loader to make a 180-degree rotation (or turn) when the compact tracker loader has a lifted bucket. A second portion of the graphical indicium overlay may indicate a second clearance that allows the compact tracker loader to make a 180-degree rotation (or turn) when the compact tracker loader has its bucket down.

According to some embodiments, each graphical indicium overlay is integrated into the video data of a corresponding camera view tile by the computer system(s) of the vehicle 302-1 and, thus, is part of the received tiled video feed data 330. Some visual cues depicted by a graphical indicium overlay may share a visual appearance across various user interface segments such that the visual cues appear to relate to a similar degree of safety or safety distance threshold. For example, a first grouping of visual cues 602, 612, 622, 632 may share a similar visual appearance, such as a display color of green. A second grouping of visual cues 604, 614, 624, 634 may share a similar visual appearance, such as a display color of orange. A third grouping of visual cues 606, 616, 626, 636 may share a similar visual appearance, such as a display color of purple.

Figure 6B:
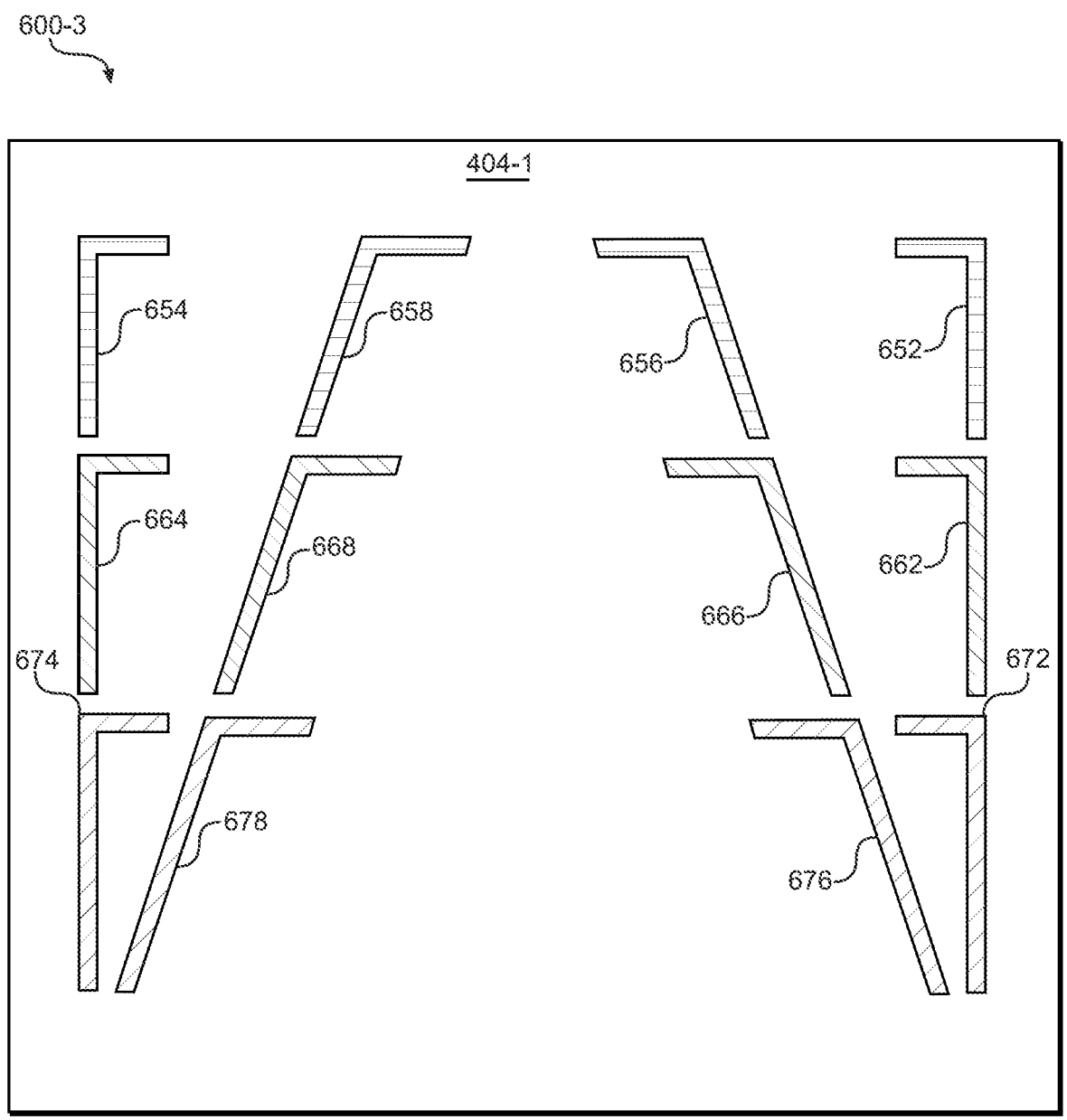

As shown in FIG. 6B, a user interface segment 600-3 for a front-facing camera may display a camera view tile 404-1 portraying a field of vision 404 from an upper-mounted, front-facing camera on the vehicle 302-1. Each graphical indicia 652 . . . 678 in the video tile 404-1 may act as a visual cue representing a safety distance—visible to the authorized teleoperator in the display of the camera view tile 404-1—in order to maintain a safe overhead clearance based on the height of the vehicle 302-1. Some visual cues may share a visual appearance within the user interface segment 600-3 such that visual cues appear to relate to a similar degree of safety. For example, a first grouping of visual cues 652, 654, 656, 658 may share a similar visual appearance, such as a display color of green. A second grouping of visual cues 662, 664, 666, 668 may share a similar visual appearance, such as a display color of orange. A third grouping of visual cues 672, 674, 676, 678 may share a similar visual appearance, such as a display color of purple.

Figure 6C:
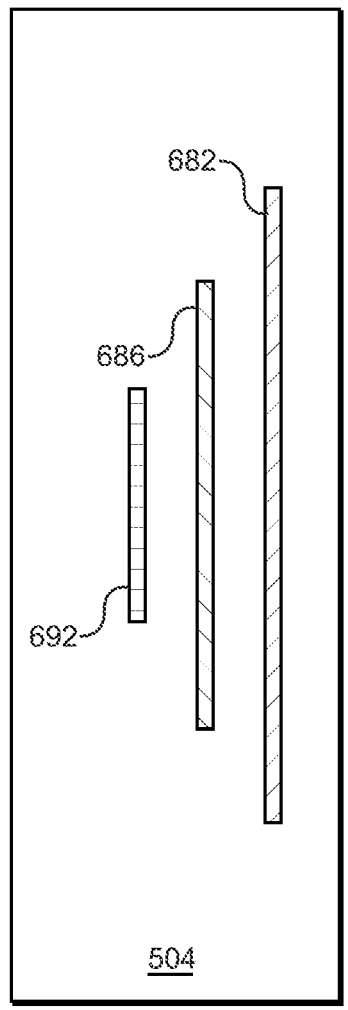
Figure 6C:
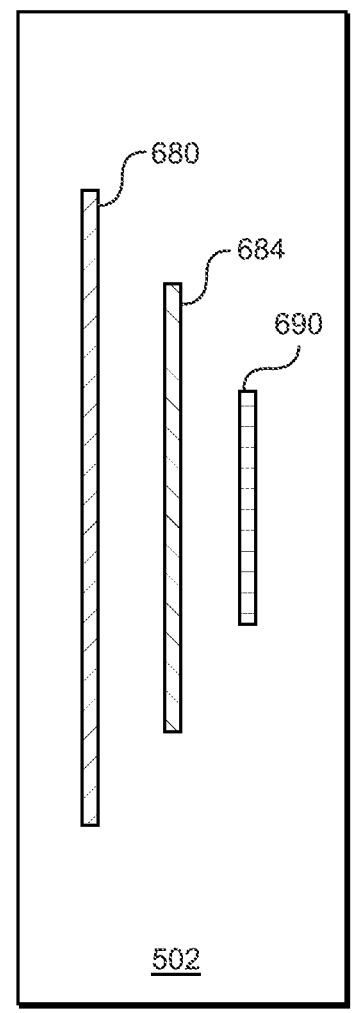

As shown in FIG. 6C, user interface segments 600-4 for right-side and left-side camera portraying respective camera view tiles 502, 504. Each graphical indicia 680 . . . 692 in the camera view tiles 502, 504 may act as a visual cue representing a safety distance observable by the authorized teleoperator at the control station 320. A first grouping of visual cues 680, 682 may share a similar visual appearance, such as a display color of purple. A second grouping of visual cues 684, 686 may share a similar visual appearance, such as a display color of orange. A third grouping of visual cues 690, 692 may share a similar visual appearance, such as a display color of green.

Figure 7A:
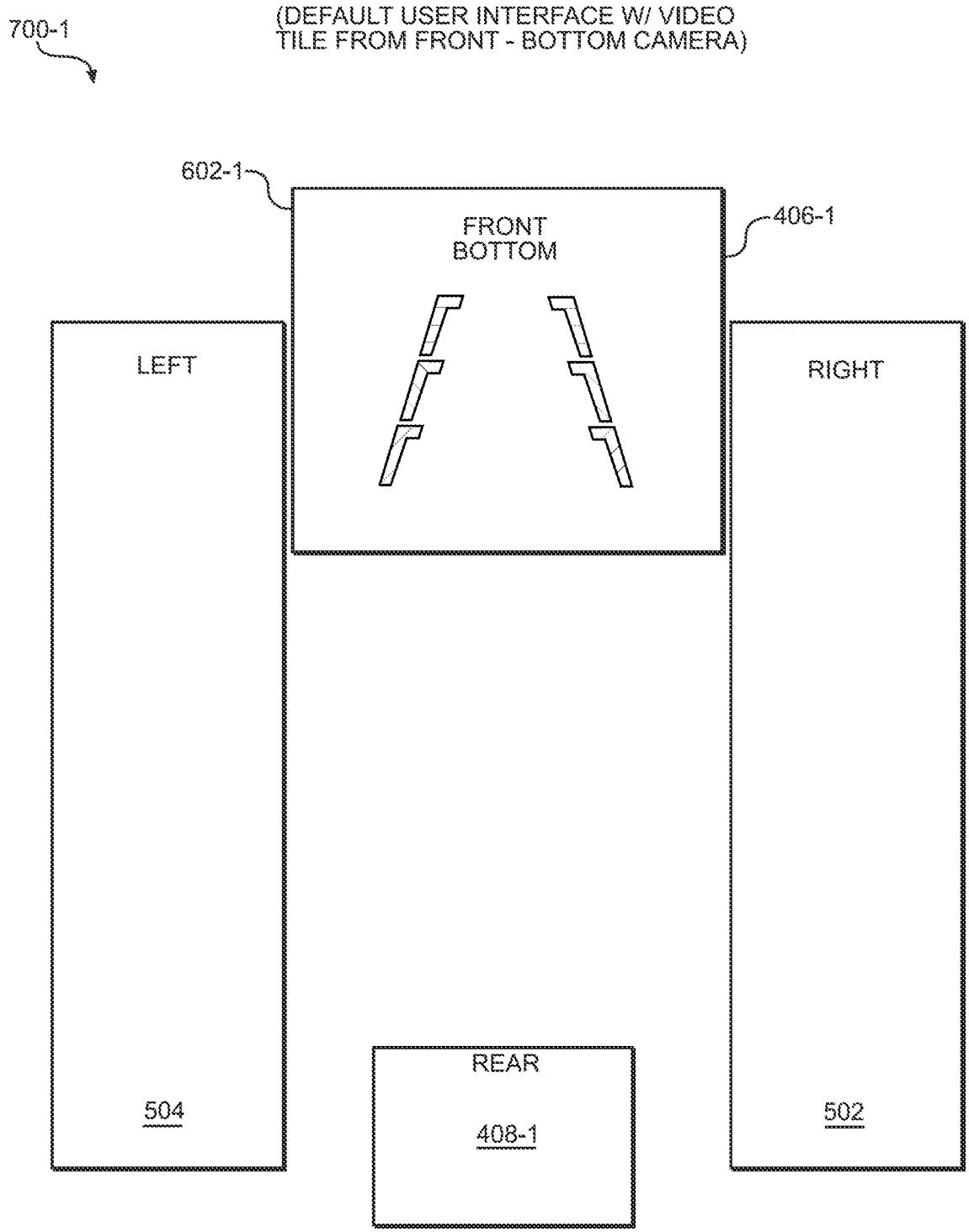
FIGS. 7A-7B are diagrams illustrating exemplary environments in which some embodiments may operate.
Figure 7B:
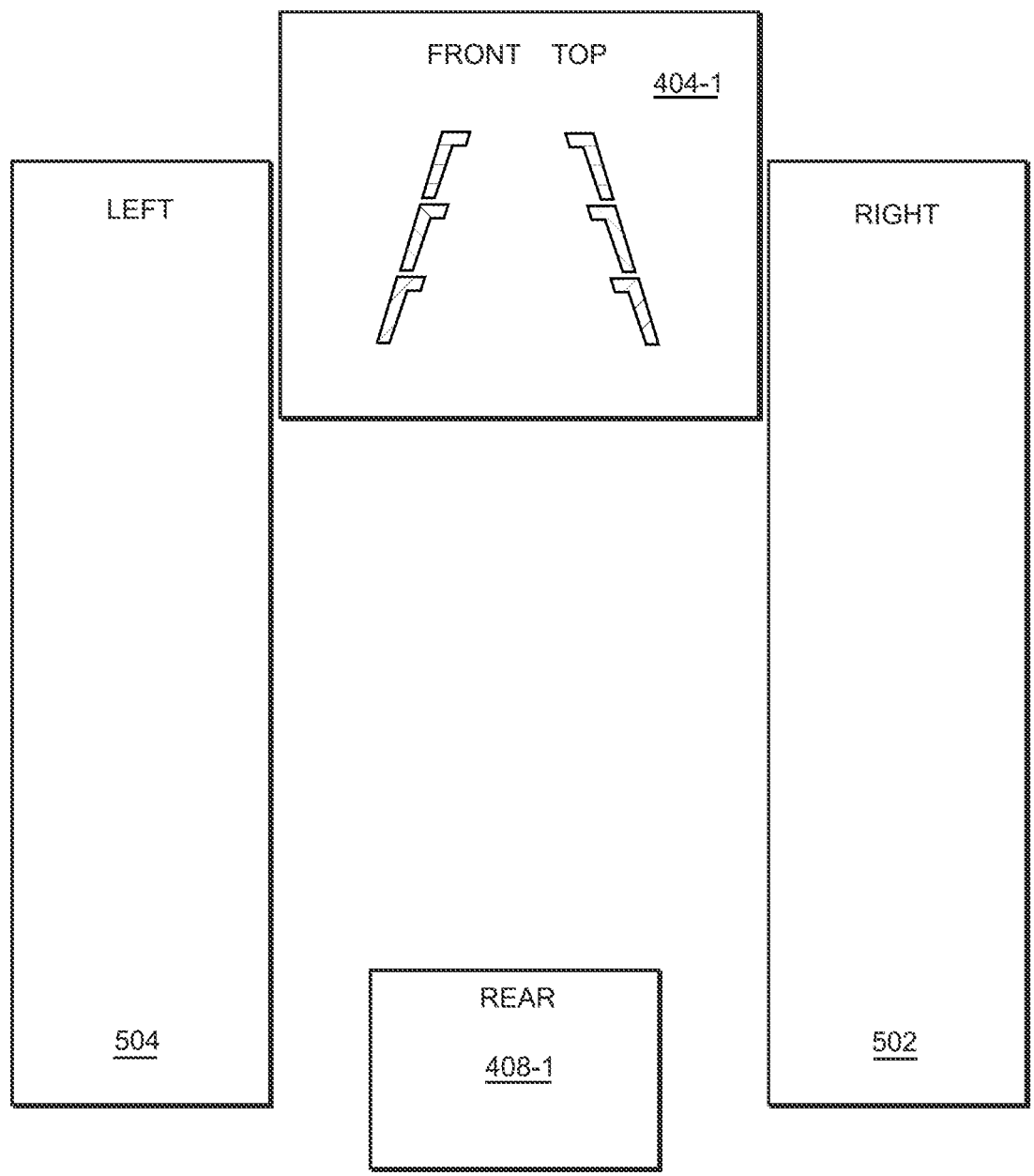
Figure 8:
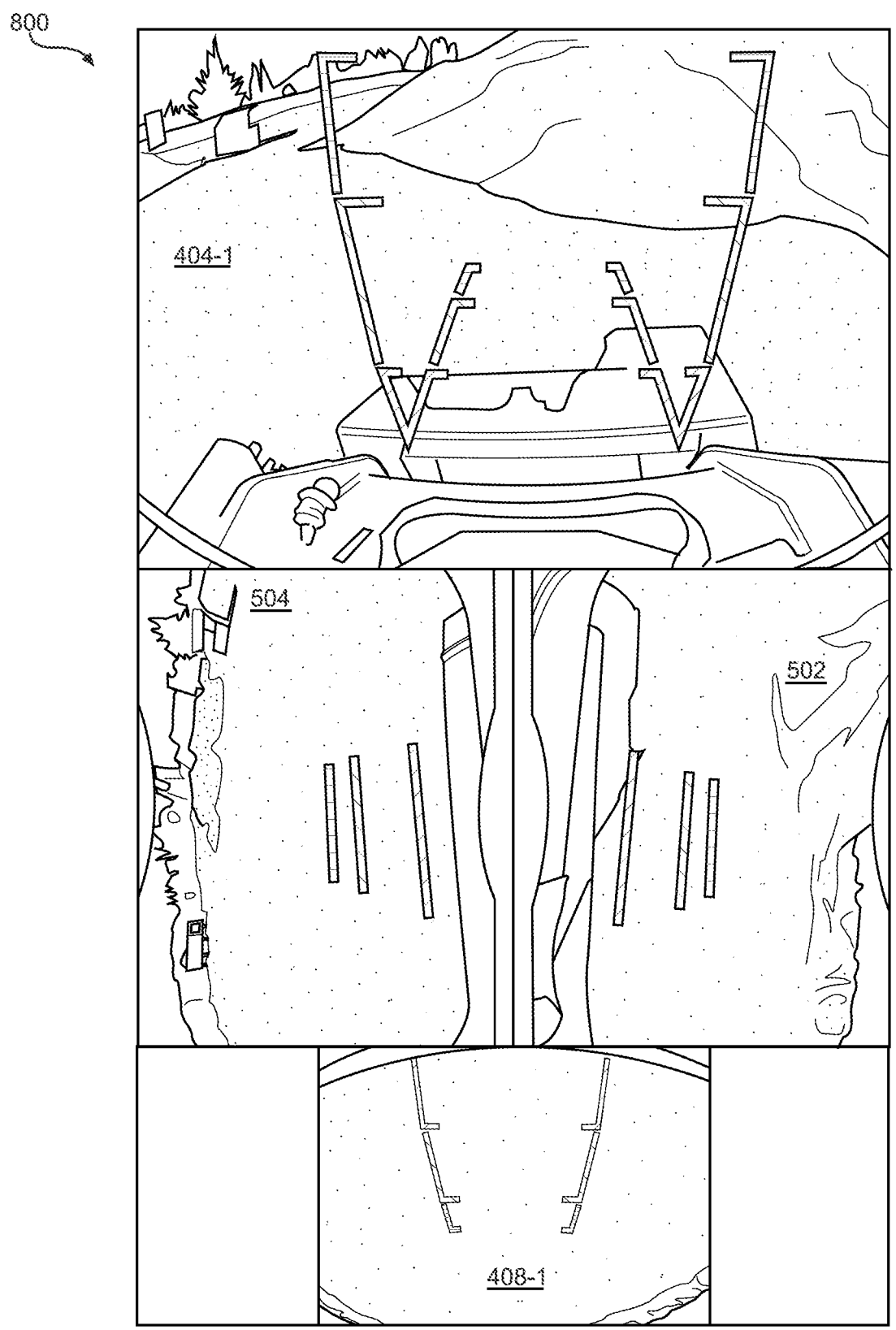
FIG. 8 is a diagram illustrating an exemplary environment in which some embodiments may operate.

As shown in FIG. 7A, a default user interface 700-1 displays a camera view tile 406-1 for a field of vision 406 of a front-facing camera mounted at the vehicle 302-1 which is below all other front-facing cameras. As shown in FIG. 7B, a default user interface 700-2 displays a camera view tile 404-1 for a field of vision 404 of a front-facing camera mounted at the vehicle 302-1 which is above all other front-facing cameras. In some embodiments, in order to transition between the default user interfaces 700-1, 700-2, the authorized teleoperator executes one or more toggle gestures with a control station joystick, where each toggle gesture requests display of a different camera view tile 402-1, 404-1, 406-1 in the user interface segment from front-facing cameras. As shown in FIG. 8, a user interface 800 with a height clearance graphical indicium overlay rendered at the control station 320 concurrently displays multiple camera view tiles 404-1, 408-1, 502, 504.

Figure 9:
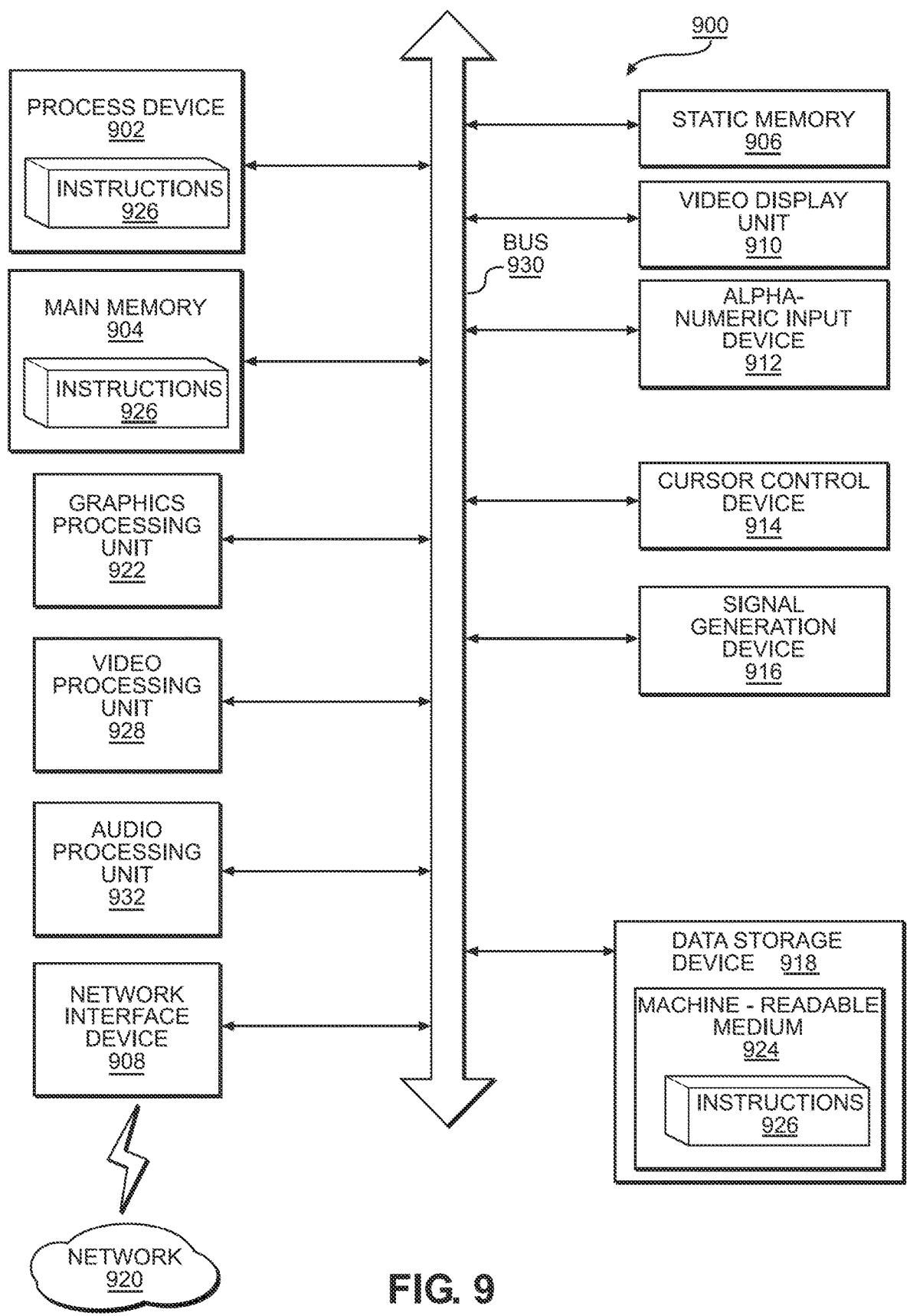
FIG. 9 is a diagram illustrating an exemplary computer that may perform processing in some embodiments.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising:
   one or more processors; and
   a non-transitory computer readable medium storing a plurality of instructions, which when executed, cause the one or more processors to:
   receive tiled video feed data sourced from one or more remotely situated vehicles;
   generate a teleoperator user interface, the teleoperator user interface including a concurrent display, within the teleoperator user interface, of a plurality of distinct video tiles from the tiled video feed data; and
   modify a resolution of one or more segments of the teleoperator user interface ("user interface segments") displaying respective video tiles in response to teleoperator input while the teleoperator user interface is displayed.

2. The system of claim 1, wherein receive tiled video feed data sourced from one or more remotely situated vehicles comprises:
   receive, in the tiled video feed data, camera view tiles, wherein each respective camera view tile comprises video data sourced from one of a plurality of cameras mounted on a particular remotely situated vehicle.

3. The system of claim 2, wherein each respective camera view tile includes a pre-assigned graphical indicium overlay on the corresponding video data.

4. The system of claim 2, wherein each pre-assigned graphical indicium overlay indicates one or more safety distances to be maintained by the particular remotely situated vehicle.

5. The system of claim 2, wherein generate a teleoperator user interface to include a concurrent display of a plurality of distinct video tiles from the tiled video feed data comprises:
   select a subset of the camera view tiles from the plurality of cameras mounted on the particular remotely situated vehicle; and
   assign each select camera view tile in the subset for display in a distinct teleoperator user interface segment.

6. The system of claim 5, further comprising:
   while each select camera view tile is concurrently displayed in the teleoperator user interface:
   replace a particular select camera view tile with a substitute camera view tile, the substitute camera view tile received in the tiled video feed data, the substitute camera view tile further including a pre-assigned graphical indicium overlay on corresponding video data.

7. The system of claim 6, wherein the particular select camera view tile is sourced from a first camera and the substitute camera view tile is sourced from a second camera, wherein both the first and the second cameras are mounted on the same particular remotely situated vehicle and have a same directional field of vision.

8. The system of claim 5, wherein modify a resolution of one or more user interface segments comprises:
   receive teleoperator display resolution input;
   based on the teleoperator display resolution input:
   increase a display resolution of a first camera view tile displayed in a first user interface segment; and decrease a display resolution of a second camera view tile displayed in a second user interface segment, wherein the first camera view tile is sourced from a first camera and the second camera view tile is sourced from a second camera, wherein both the first and the second cameras are mounted on the same particular remotely situated vehicle and have different directional field of visions.

9. The system of claim 1, wherein the system further comprises:
   determine presence of an authorized teleoperator based on validating a visual image of a portion of the operator's physical appearance; and
   determine whether to lock or unlock one or more functionalities selectable by the authorized operator based on validating an extent of teleoperator attention represented in the visual image of a portion of the operator's physical appearance.

10. A computer-implemented method, comprising:
    receiving tiled video feed data sourced from one or more remotely situated vehicles;
    generating a teleoperator user interface, the teleoperator user interface including a concurrent display, within the teleoperator user interface, of a plurality of distinct video tiles from the tiled video feed data; and
    modifying a resolution of one or more segments of the teleoperator user interface ("user interface segments") displaying respective video tiles in response to teleoperator input while the teleoperator user interface is displayed.

11. The computer-implemented method of claim 10, wherein receiving tiled video feed data sourced from one or more remotely situated vehicles comprises:
    receiving, in the tiled video feed data, camera view tiles, wherein each respective camera view tile comprises video data sourced from one of a plurality of cameras mounted on a particular remotely situated vehicle.

12. The computer-implemented method of claim 11, wherein each respective camera view tile includes a pre-assigned graphical indicium overlay on the corresponding video data.

13. The computer-implemented method of claim 11, wherein each pre-assigned graphical indicium overlay indicates one or more safety distances to be maintained by the particular remotely situated vehicle.

14. The computer-implemented method of claim 11, wherein generating a teleoperator user interface to include a concurrent display of a plurality of distinct video tiles from the tiled video feed data comprises:
    selecting a subset of the camera view tiles from the plurality of cameras mounted on the particular remotely situated vehicle; and
    assigning each select camera view tile in the subset for display in a distinct teleoperator user interface segment.

15. The computer-implemented method of claim 14, further comprising:
    while each select camera view tile is concurrently displayed in the teleoperator user interface:
       replacing a particular select camera view tile with a substitute camera view tile, the substitute camera view tile received in the tiled video feed data, the substitute camera view tile further including a pre-assigned graphical indicium overlay on corresponding video data.

16. The computer-implemented method of claim 15, wherein the particular select camera view tile is sourced from a first camera and the substitute camera view tile is sourced from a second camera, wherein both the first and the second cameras are mounted on the same particular remotely situated vehicle and have a same directional field of vision.

17. The computer-implemented method of claim 14, wherein modifying a resolution of one or more user interface segments comprises:
    receiving teleoperator display resolution input;
    based on the teleoperator display resolution input:
       increasing a display resolution of a first camera view tile displayed in a first user interface segment; and
       decreasing a display resolution of a second camera view tile displayed in a second user interface segment, wherein the first camera view tile is sourced from a first camera and the second camera view tile is sourced from a second camera, wherein both the first and the second cameras are mounted on the same particular remotely situated vehicle and have different directional field of visions.

18. The computer-implemented method of claim 10, further comprising:
    determining presence of an authorized teleoperator based on validating a visual image of a portion of the operator's physical appearance; and
    determining whether to lock or unlock one or more functionalities selectable by the authorized operator based on validating an extent of teleoperator attention represented in the visual image of a portion of the operator's physical appearance.

19. A computer program product comprising a non-transitory computer-readable medium having a computer-readable program code embodied therein to be executed by one or more processors, the program code including instructions to:
    receive tiled video feed data sourced from one or more remotely situated vehicles;
    generate a teleoperator user interface, the teleoperator user interface including a concurrent display, within the teleoperator user interface, of a plurality of distinct video tiles from the tiled video feed data; and
    modify a resolution of one or more segments of the teleoperator user interface ("user interface segments") displaying respective video tiles in response to teleoperator input while the teleoperator user interface is displayed,
    wherein receive tiled video feed data sourced from one or more remotely situated vehicles comprises:
       receive, in the tiled video feed data, camera view tiles;
          wherein each respective camera view tile comprises video data sourced from one of a plurality of cameras mounted on a particular remotely situated vehicle;
          wherein each respective camera view tile includes a pre-assigned graphical indicium overlay on the corresponding video data; and
          wherein each pre-assigned graphical indicium overlay indicates one or more safety distances to be maintained by the particular remotely situated vehicle.

* * * * *